INVENTORS
Kenneth G. Kreuter
& Larry S. Smith

| Pole | SELECTED PAIR OF ENERGIZED POLE GROUPS | | | | |
|---|---|---|---|---|---|
| | I and II | II and III | III and IV | IV and I | I and II |
| 1 | N | S | S | N | N |
| 2 | N | N | S | S | N |
| 3 | S | N | N | S | S |
| 4 | S | S | N | N | S |
| 5 | N | S | S | N | N |
| 6 | N | N | S | S | N |
| 7 | S | N | N | S | S |
| 8 | S | S | N | N | S |

INVENTORS
Kenneth G. Kreuter
& Larry S. Smith

BY *Birch & Birch*

ATTORNEYS

INVENTORS
Kenneth G. Kreuter
& Larry S. Smith
BY Birch & Birch
ATTORNEYS

FIG. II.

United States Patent Office 3,453,510
Patented July 1, 1969

3,453,510
LINEAR AND ROTARY DIRECT CURRENT STEP-PING MOTORS AND CONTROL SYSTEM
Kenneth G. Kreuter and Larry S. Smith, Goshen, Ind., assignors to Robertshaw Controls Company, Richmond, Va., a corporation of Delaware
Original application Apr. 30, 1964, Ser. No. 363,818, now Patent No. 3,293,459, dated Dec. 20, 1966. Divided and this application Aug. 26, 1966, Ser. No. 575,295
Int. Cl. H02k *37/00*
U.S. Cl. 318—18       5 Claims

ABSTRACT OF THE DISCLOSURE

A self-balancing control system for position indexing a stepping motor in response to a process variable is provided including an impedance bridge which is unbalanced by the deviation of process variable from a predetermined value by means of a sensor included in the bridge circuit to produce an unbalance signal. The unbalance signal actuates control relay devices to selectively displace the stepping motor to effect a modulation of the process variable. The stepping motor simultaneously modulates a feedback system which is so interconnected with the stepping motor and the impedance bridge as to effect a rebalancing of the bridge when the deviation of the process variable has been corrected.

---

This invention deals with electric stepping motors and more particularly, to direct current stepping motors of both the linear and rotary type in which an input pulse of direct current to the motor results in a corresponding step motion output of the motor, and is a division of application Ser. No. 363,818 filed Apr. 30, 1964, now U.S. Patent 3,293,459.

It is an object of this invention to provide new and novel electric stepping motor structures for linear and rotary stepped motion outputs, respectively.

It is another object of this invention to provide new and novel electric stepping motor structures of the direct current permanent magnet type which are of simpler construction, of lower cost and which have a longer useful life than conventional motor structures.

Another object of this invention is to provide new and novel electric stepping motor structures of the direct current permanent magnet type which obviate the need for a commutator means and which, as a result, are explosion proof.

Still another object of this invention is to provide novel rotary and linear electric stepping motors as compatible direct output terminal control means for modern digital computer control systems.

Still another object of this invention is to provide new and novel stepping actuator means comprising electric stepping motor structures and integral control means for same.

Yet another object of this invention is to provide new and novel electric stepping motors and self-balancing condition control systems incorporating same.

These and other objects of the present invention will become more fully apparent with reference to the following specification and drawings which relate to several preferred embodiments of the invention.

Rotary stepping motors

Figures 1, 2:
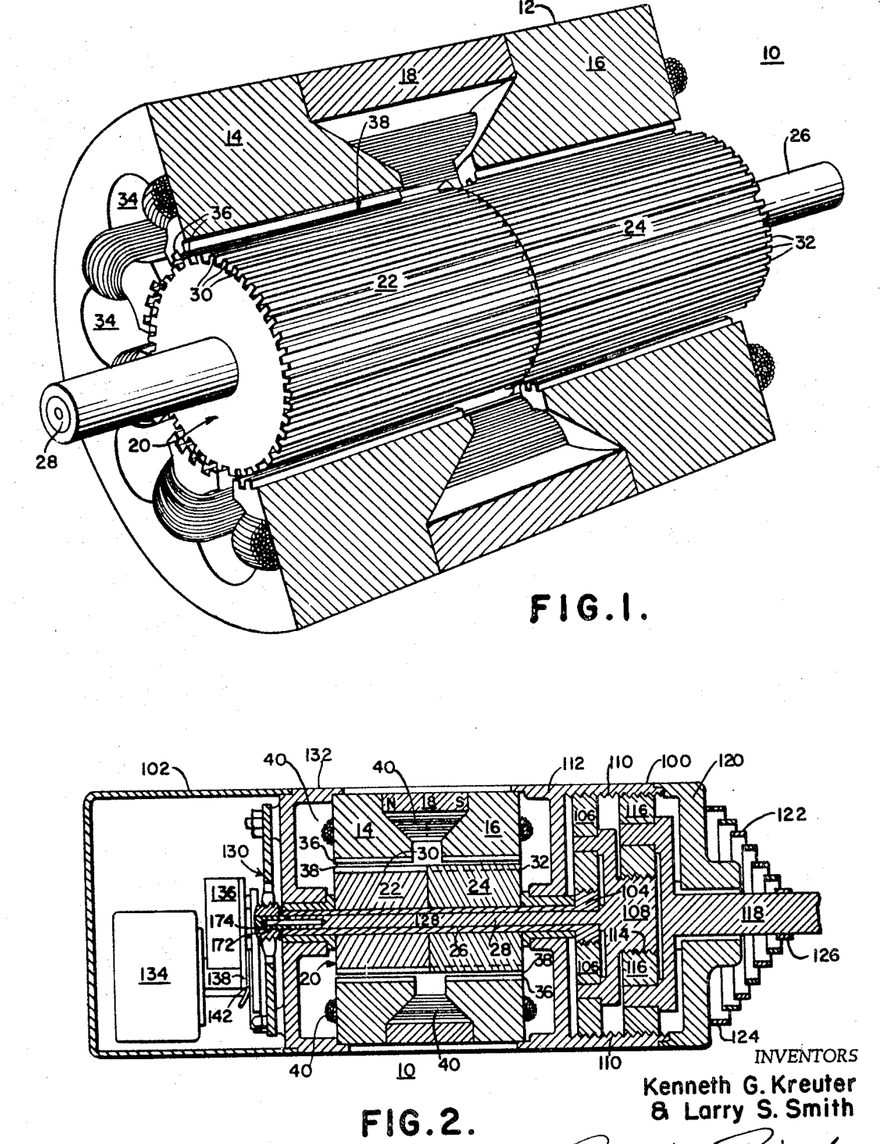
FIGURE 1 is a longitudinal cross-section taken in perspective of a rotary stepping motor of the present invention.
FIGURE 2 is a detailed longitudinal cross-section of a rotary stepping motor with integral control means, the combination comprising a stepping actuator means for condition control systems.
Figure 3:
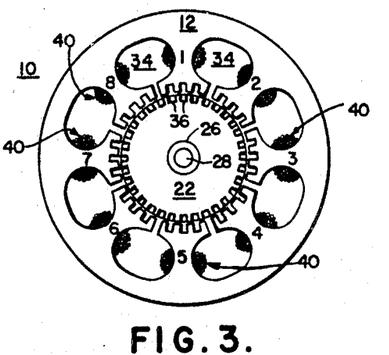
FIGURE 3 is a cross-sectional end view of the stator and rotor structure of the rotary stepping motor structure of FIGURES 1 and 2, taken along line 3—3 of FIGURE 2.

Referring in detail to the drawings, and more particularly to FIGURES 1, 2 and 3, a preferred embodiment of a rotary stepping motor 10 of the present invention is shown as including a stator 12, having first and second cylindrical sections 14 and 16, respectively, separated by an annular permanent magnet 18 of the same outside diameter.

Within the stator 12 is a rotor 20, having first and second sections 22 and 24, respectively, concentrically disposed within the first and second sections 14 and 16 of the stator 12. The said rotor sections are fixed, coaxially, on a common rotary shaft 26 which shaft has a longitudinal bore 28 therein.

The first rotor section 22 is provided with a first plurality of evenly spaced, longitudinally extending radial teeth 30 about the periphery thereof, the said teeth 30 being substantially rectangular in cross-section and having radial slots therebetween.

The second rotor section 24 is provided with a second like plurality of radial teeth 32, parallel with the first teeth 30 but peripherally offset one tooth dimension with respect thereto, the teeth of the first section 22 matching the slots of the second section 24 and vice-versa.

The stator 12 includes a plurality of longitudinally extended radial winding slots 34 defining therebetween a plurality of stator pole pieces 1, 2, 3, 4, 5, 6, 7 and 8, respectively. These pole pieces are duplicated on both the sections 14 and 16 of the stator 12 and are in full registry.

Each of the pole pieces 1–8 have a plurality of inwardly facing, longitudinally extending equally spaced radial teeth 36. The stator teeth 36 face the rotor teeth 30 and 32 across an air gap 38.

A plurality of stator windings 40 are provided in the winding slots 34, the said windings 40 being common to both sections of the stator 12.

In this preferred embodiment the stator teeth 36 are so dimensioned as to number fifty-two (52) teeth and a like number of grooves therebetween around the total inner periphery of the stator, including the winding slots. Thus, there are, by actual count, a lesser number of stator teeth than fifty-two (52), specifically forty (40).

The rotor 20 is provided with a lesser number of teeth than the stator 12, specifically fifty (50) teeth and a like number of grooves. Thus, it is impossible for all of the rotor and stator teeth 30–32 and 36, respectively, to be simultaneously in alignment. This physical relationship will be hereinafter more fully described.

Figure 5:
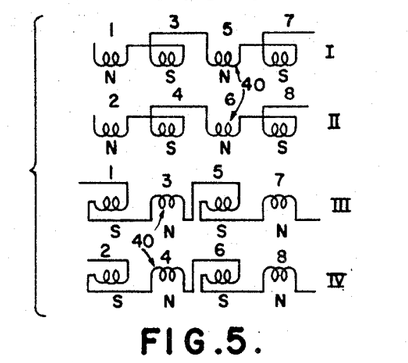
FIGURE 5 is a schematic showing the manner of winding the stator structure stepping motor structures of the present invention.
Figure 6:
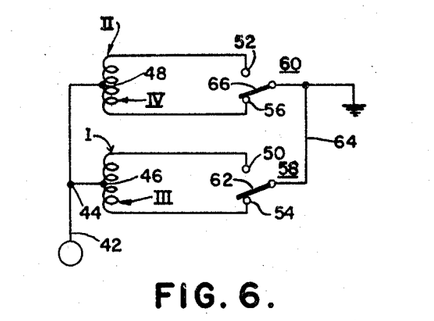
FIGURE 6 is a schematic of the basic control circuit for stepping motors of the present invention.

Referring additionally to FIGURES 5 and 6, the stator windings 40 comprises bifilar windings such that each of the pole pieces 1–8, respectively, may be polarized either north or south by selective switching. Thus, there are first, second, third and fourth operating winding groups I, II, III and IV, respectively, which are as follows:

| Pole group | Pole group | Polarity |
| --- | --- | --- |
| I | 1 and 5 | N |
|   | 3 and 7 | S |
| II | 2 and 6 | N |
|   | 4 and 8 | S |
| III | 3 and 7 | N |
|   | 1 and 5 | S |
| IV | 4 and 8 | N |
|   | 2 and 6 | S |

First and second pole groups I and II are schematically illustrated in FIGURE 5. Third and fourth pole groups III and IV are wound in reverse sense to the first and second pole groups I and II, respectively.

In FIGURE 6, the selective switching means for the pole groups I–IV is shown as comprising a positive polarity power lead 42 providing a common input connection 44 through common nodes 46 and 48 on pole groups I–III and II–IV, respectively.

The first, second, third and fourth pole groups I, II, III and IV include, respectively, first, second, third and fourth selector nodes 50, 52, 54 and 56, comprising the fixed contacts of a pair of single-pole, double-throw selector switches 58 and 60.

The first selector switch 58 includes a first moving contact 62, connected at ground potential via a lead 64, selectively contacting the first and third selector nodes 50 and 54, respectively and thus placing same at ground potential.

The second selector switch 60 includes a second moving contact 66, connected at ground potential via the lead 64, selectively contacting the second and fourth selector nodes 52 and 56, respectively and thus placing same at ground potential.

Figure 7:
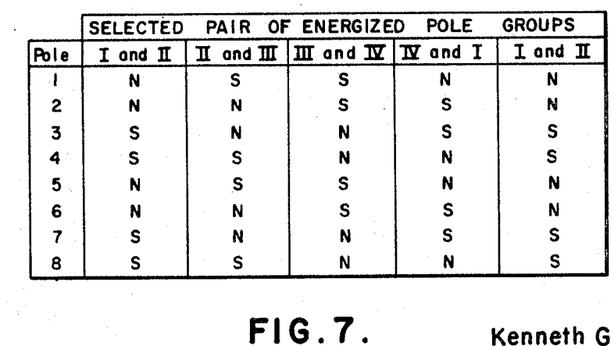
FIGURE 7 is a stator polarity permutation chart for the illustrated embodiments herein of the present invention.

As a result of the selective switching arrangement described in FIGURE 6, the permutations and combinations of polarities imparted to the respective pole pieces 1–8 are shown in the table of FIGURE 7, power being supplied to selected pairs of pole groups for operation of the rotary stepping motor 10.

Figure 4:
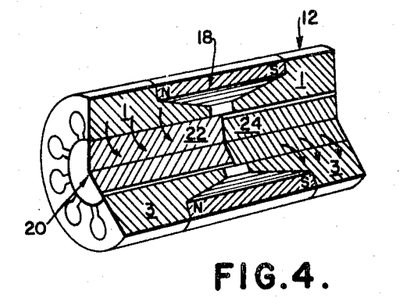
FIGURE 4 is a schematic in perspective showing the magnetic flux path through the rotary stepping motor structure of FIGURES 1, 2 and 3.

Referring now to FIGURE 4 as well as to FIGURES 1 to 3 and 5 to 7, inclusive, the basic operation of the rotary stepping motor 10 will now be described.

The permanent magnet 18 in the stator 12 is polarized as shown by the letters N and S, north and south, respectively. Because of the fact that the first and second rotor sections 22 and 24, respectively, are one tooth out of alignment, the lines of flux, represented by the curved arrows in FIGURE 4, flow for example from the first pole piece 1, through the air gap 38 to the teeth 30 of the first rotor section 22 axially along the rotor 20 into the second rotor section 24 and thence, from the second set of rotor teeth 32 back across the air gap 38 to the third pole piece 3.

In further explanation, because of the staggered arrangement of the groups of rotor teeth 30 and 32 any given stator pole piece will have its teeth substantially aligned with a preselected one of the said rotor sections 22 and 24. This selection is such that adjacent pairs of pole pieces may be of opposed polarities. For example, if pole pieces 1 and 2 are of north polarity, pole pieces 3 and 4 are of south polarity, pole pieces 5 and 6 are of north polarity and pole pieces 7 and 8 are of south polarity. Further exemplification of this arrangement becomes apparent from observing the winding arrangement of pole groups I, II, III and IV in FIGURE 5. Thus, the permanent magnet bias effected by the related stator 12 and staggered tooth multiple segment rotor structure 20 is fully compatible with the polarity permutations of the stator windings 40.

Figure 8:
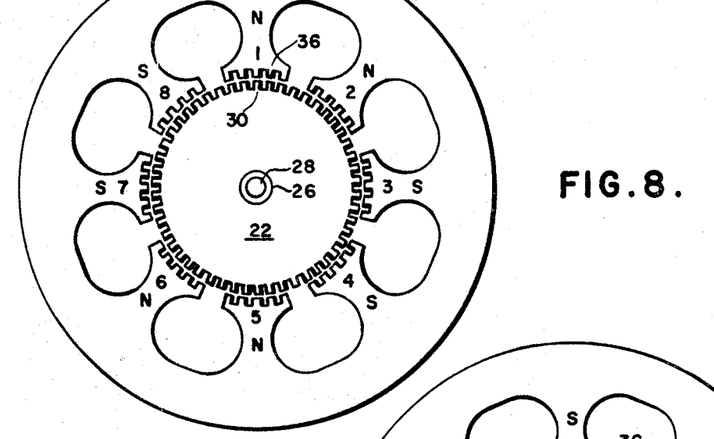
FIGURE 8 is a schematic of a first operative relative position of the stator and rotor of a rotary stepping motor of the present invention.

Assuming energization of pole groups I and II by the system of FIGURE 6, thereby effecting the respective polarities of the pole pieces 1–8 as shown in FIGURE 6, and referring to FIGURE 8, the following takes place with respect to the first rotor section 22.

The first rotor teeth 30 will attempt to align themselves with the teeth of pole pieces 1, 2, 5 and 6 (all north polarity) and will be repelled by the teeth of pole pieces 3, 4, 7 and 8 (all south polarity) because of the interaction between the magnetic flux generated in the stator 12 and the first section 22 of the rotor, 20, as generated by the permanent magnet 18 and augmented by the energization of the windings 40, which interaction is always toward an equilibrium position in which the optimum magnetic circuit is completed from the stator 12, through the rotor 20 and back to the stator 12.

Because of the deliberate disparity in the size and number of the stator teeth 36 and the rotor teeth 30, it is readily understood, and shown in FIGURE 8, that those of the first rotor teeth 30 adjacent those pole pieces of north polarity on the first stator section 14 are in three-fourths of full alignment with the stator teeth 36 while those of the first rotor teeth 30 adjacent those pole pieces of south polarity are only in one-fourth of full alignment with the stator teeth 36. Thus, the novel structure used creates a self-regulating system which seeks an optimum position of equilibrium when energized.

Simultaneously with the reactive forces on the first rotor section 22, because of the staggered relationship of the second rotor teeth 32 on the second rotor section 24 with respect to the first rotor teeth 30, the said second rotor section 24 is constrained by its teeth 32 to assume three-fourths of full tooth alignment with the stator teeth 36 on those pole pieces on the second stator section 16 which are of south polarity and one-fourth of full tooth alignment with the stator teeth 36 on those pole pieces of the said second stator section 16 which are of south polarity and one-fourth of full tooth alignment with the stator teeth 36 on those pole pieces of the said second stator section 16 which are of north polarity.

Referring back to FIGURE 4, this action of the magnetic flux generates a powerful torque or force moment about the rotor shaft 26, causing it to turn in an incremental amount, determined by the relative dimensions of the respective stator and rotor structures 12 and 20, until a position of equilibrium has been achieved by the rotor 20. Thus, the motor 10 can be said to have been energized through a single step of rotation, a step being synonymous with a preselected increment of rotation.

Figure 9:
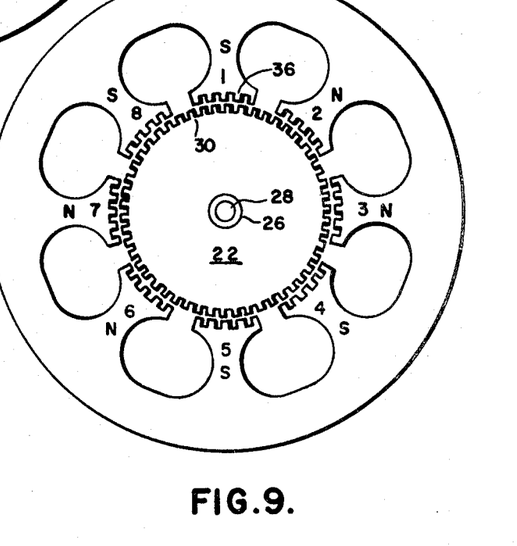
FIGURE 9 is a schematic of a second operative relative position of the stator and rotor of a rotary stepping motor of the present invention.

Referring now to FIGURE 9, assume that subsequent to the energization of pole groups I and II the pole groups II and III are both energized. This results in a rotation of like polarity pairs of pole pieces clockwise for one pole piece. This creates an unbalance which causes a constraining torque to once again be generated in the rotor 20. As a result, the rotor 20 and the rotor shaft 26 are rotated through one more step of rotation effecting the above-defined equilibrium positions of alignment between the stator teeth 36 and the rotor teeth 30 and 32.

Proceeding from left to right in the chart of FIGURE 7, it thus becomes evident that continuous rotation can be effected, the term continuous in this case meaning a series of rotational steps, by energizing, in sequence, pole group pairs I and II, II and III, III and IV and IV and I and thereafter repeating the sequence for as long a time as the said rotation is to continue.

The motor rotation may be reversed at any time by proceeding from any given pole group pair of FIGURE 7 to the adjacent left-hand pole group pair. In other words, as shown relative to FIGURES 8 and 9, counter-clockwise rotation may be effected by reversing the sequence of energization of the pole group pairs. This may be done for a single step as well as for a series of steps.

Thus, the rotational displacement of the output shaft is the algebraic sum of the steps through which the rotor has been energized, clockwise steps, for example, being considered as positive increments and counterclockwise steps being considered as negative increments.

Linear stepping motors

It is often necessary in position modulated systems and the like to effect incremental bidirectional linear motions. This may be affected directly from a motor structure per se under the present invention rather than through power take-off means such as rack-and-pinion gearing and the like.

Figures 10, 14, 15, 16, 17:
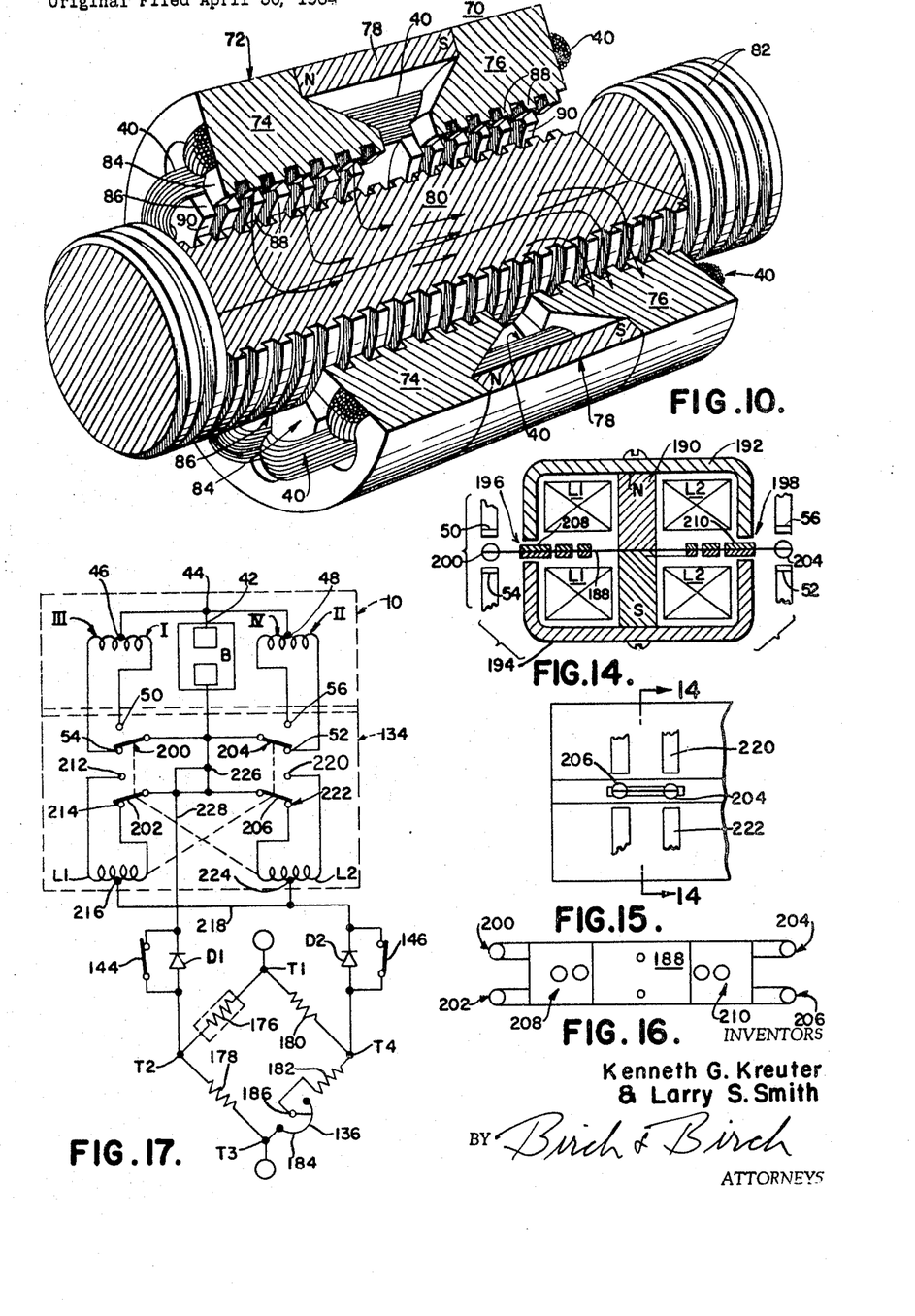
FIGURE 10 is a longitudinal cross-section, in perspective, of a linear stepping motor of the present invention.
FIGURE 14 is a cross-sectional schematic of a control relay of the present invention.
FIGURE 15 is an end view, partially broken away, of the relay of FIGURE 14.
FIGURE 16 is a top plan view of the armature of the relay of FIGURES 14 and 15.
FIGURE 17 is a schematic of a self-balancing condition control system of the present invention.
Figure 11:
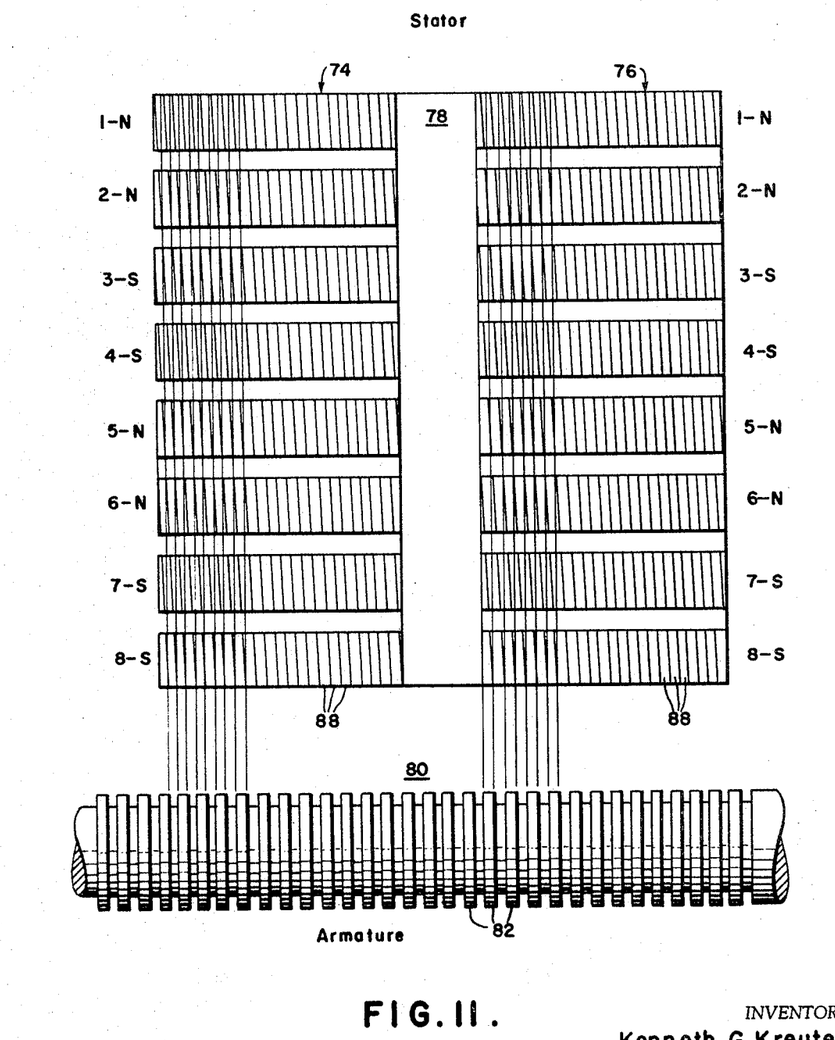
FIGURE 11 is a structural schematic of the linear stepping motor of FIGURE 10 illustrating the physical relationships between the stator and rotor structures thereof.

Referring now to FIGURES 10 and 11, a preferred embodiment of a linear stepping motor 70 will be described.

The stator structure 72 comprises first and second in-line cylindrical sections 74 and 76, respectively, separated axially by a mutually juxtaposed cylindrical permanent magnet 78, polarized as shown.

The armature 80 comprises a unitary cylindrical member having a plurality of equally and axially spaced annular teeth 82 thereon. The armature 80 is internally concentric with the stator sections 74 and 76 and the permanent magnet 78 and is adapted to extend for substantial distances in either direction from the ends of the stator 72.

Each of the first and second stator sections 74 and 76 are provided with radially and inwardly extending longitudinally disposed pole pieces 84 separated by a like plurality of winding slots 86.

The winding slots 86 in both said rotor sections 74 and 76 are in alignment and receive bifilar windings 40 wound exactly as shown in FIGURES 3, 4 and 5 and adapted for the same energization sequences illustrated in FIGURES 6 and 7. Thus, the stator pole pieces 1–8 of the linear motor 70 are energized identically with those of the rotary motor 10.

As best illustrated in FIGURE 11, the pole pieces 1–8 of each stator section, within that section, include axially progressing, radially extending helical teeth 88 facing the annular rotor teeth 82 across an air gap 90. In the preferred embodiment shown there is a two thread lead in the helical stator teeth 88.

Both the first and second stator sections 74 and 76, respectively, are identically threaded, however, the second stator section 76 is rotated ninety degrees (90°) with respect to the first stator section 74. This results in a one tooth discontinuity between the stator sections 74 and 76, the affect of which will be hereinafter more fully described.

Because of the single tooth discontinuity between stator sections, the teeth 88 of one of the pole pieces in the first stator section 74 can be in substantial alignment with the rotor teeth 82 while the stator teeth 88 of the like numbered pole pieces in the second stator section 76 will be out of alignment with the rotor teeth 82 and vice-versa.

Because of the magnetic bias set up by the permanent magnet 78, referring to FIGURE 10, flux flows from the north pole N thereof through the aligned north polarity pole pieces of the pole pieces 1–8 in the first stator section 74, across the air gap 90 to the rotor teeth 82, axially of the rotor 80, and back through the rotor teeth 82 and the air gap 90, through the aligned south polarity pole pieces of the second stator section 76 to the south pole S of the magnet 78.

Thus, as in the rotary step motor 10 previously described heerin, the respective teeth of the stator 72 and the armature 80 (the latter being equivalent to the rotor 20 of the rotary motor 10) are constrained by the magnetic field to achieve substantial alignment at preselected pole pieces to effect an optimum magnetic flux path therethrough.

For example, referring to FIGURE 11 and assuming excitation of pole winding groups I and II, the first stator section 74 will substantially align the helical teeth 88 on the pole piece pairs 1–2 and 5–6 with a group of annular teeth 82 on left hand side of the armature 80 while the pole piece pairs 3–4 and 7–8 will align with the right hand side of the armature 80.

Because of the single tooth disparity between stator sections, the end result is that neither of the above-defined pole piece pairs can be fully aligned with the teeth of the armature 80. However, both sections exert an axial force on the armature 80 to accelerate it to an equilibrium position of substantial alignment with both the north polarity pole pieces of the first stator section 74 and the south polarity pole pieces of the second stator section 76. Thus, the armature 80 has been constrained through an axial step.

By the direction of the sequence of energization of pole groups, the axial steps taken by the armature 80 may be bidirectionally controlled.

As shown in FIGURE 7, the pole group sequence I–II, II–III, III–IV, IV–I will step the armature 80 from left to right as shown in FIGURE 11, while the sequence IV–I, IV–III, III–II, II–I, I–IV will step the armature 80 in the opposite direction.

Rotary stepping motor and integral control means

Referring to FIGURE 2, a rotary stepping motor and integral control structure, all comprising a digital rotary stepping actuator will now be described.

One of the primary uses of rotary stepping motors under the present invention is as a digital to rotary motion transducer, the rotary motion being quantized in steps or increments as previously described herein.

A preferred embodiment of such a transducer or actuator is shown in FIGURE 2 as including the rotary stepping motor 10 with a power takeoff means 100 at one end of the rotor shaft 26 and control means 102 at the other end of the said shaft 26.

The power takeoff means 100 includes an integral output pinion 104 on the rotor shaft 26 which is in driving engagement with a first plurality of planet gears 106, the latter being mounted to a common rotary hub means 108. The first planet gears 106 are also in engagement with a circular gear track 110 on the inner periphery of a first end cap 112 of the motor 10.

The rotary hub means 108 includes a peripheral pinion gear 114 which is in driving engagement with a second plurality of planet gears 116, these also being engaged with the circular gear track 110.

The second planet gears 116 are integrally mounted with the output shaft 118 of the transducer, the said shaft 118 being coaxial with the rotor shaft 26 of the motor 10.

The output shaft 118 is journalled through an end cap assembly 120 which interlocks with the end cap 112 of the motor 10. A helical return spring 122 is mounted concentrically with the output shaft 118 and has a first end 124 fixed to the end cap 112 and a second end 126 fixed to the said shaft 118 for a purpose to be hereinafter described.

It is to be understood that more or less planetary stages may be used in the power takeoff means 100 depending on the gear ratios desired, thus varying the size of the output steps through which the output shaft 118 is driven.

In order that the motor 10 and the transducer unit may be incorporated in a self-balancing or servo type system, the output motion is interconnected with the control means 102 via a feedback shaft 128, integral and coaxial with the rotary hub means 108 in the power takeoff 100, which is located within the hollow bore 26 of the rotor shaft 26 and is free to rotate therein.

At the opposite end of the motor 10, a circuit board 130 is mounted on the other end cap 132 of the said motor.

The circuit board 130 comprises the mounting base for a plurality of control circuit components including an energizing relay 134 and a rebalancing rheostat 136, the latter including an integral limit control to be hereinafter described.

Figure 12:
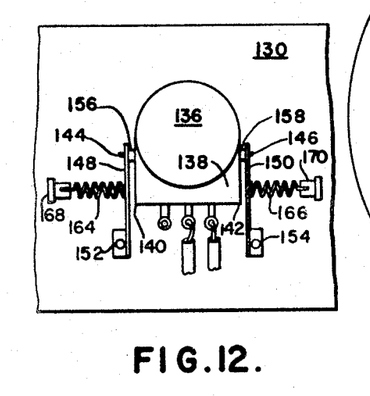
FIGURE 12 is a front plan view of a portion of an integral control board and limit switch and rebalancing means of the embodiment of FIGURE 2.
Figure 13:
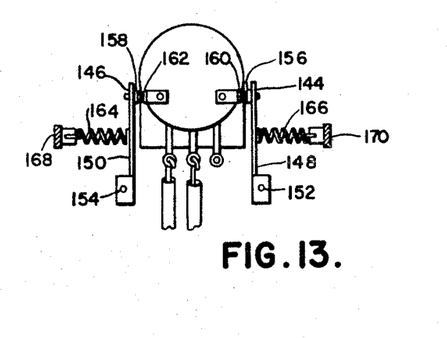
FIGURE 13 is a rear plan view of FIGURE 12.

Referring additionally to FIGURES 12 and 13, the rheostat 136 is shown to comprise a generally cylindrical housing portion with an eccentric base 138 in the form of a dependent rectangular tab means having first and second opposed lower corners or rises 140 and 142 thereon. First and second spring biased limit switches 144 and 146, respectively, are positioned adjacent the said first and second rises 140 and 142 of the rheostat base 138.

The limit switches 144 and 146 include, respectively, flexible switch blade 148 and 150 anchored at one end by means of rivets or the like 152 and 154 to the circuit board 130 and carrying first and second switch contacts 156 and 158, respectively, at the other ends thereof.

Third and fourth switch contacts 160 and 162 are mounted on the back of the rheostat 136 and are adapted to make and break, respectively, with the first and second switch contacts 156 and 158. The said contacts are normally closed by means of first and second coiled compression springs 164 and 166 mounted between the first and second switch arms 148 and 150 and first and second mounting tabs 168 and 170, respectively, fixed to the circuit board 130.

The entire rheostat assembly 136 is mounted, by means of the variable tap operating shaft 172 thereof, directly to the feedback shaft 128 by means of a key 174 or the like. The reason for such a mounting of the rheostat 136 will be hereinafter described.

Referring now to FIGURES 14, 15, 16 and 17, the energizing relay 134 and a preferred embodiment of a control system including the said relay 134 and the rebalancing rheostat 136 will now be described.

A direct current Wheatstone bridge circuit having first, second, third and fourth bridge terminals T1, T2, T3 and T4, respectively, defining first, second, third and fourth bridge arms T1–T2, T2–T3, T3–T4 and T1–T4 is provided as a condition sensing transducer.

The first bridge arm T1–T2 comprises, for example, a thermistor means 176, thereby monitoring temperature as a function of electrical resistance.

The second and fourth bridge arms T2–T3 and T1–T4 comprise single fixed resistance means 170 and 180, respectively.

The third bridge arm T3–T4 comprises a fixed resistance means 182 in series with the rebalancing rheostat 136, the latter being shown as comprising a variable resistance element 184 connected at one end thereof to the bridge terminal T3 and connected intermediate its ends via a variable tap 186 to the said resistance means 182. Thus, depending upon the position of the variable tap 186, more or less resistance may be placed in series with the fixed resistance means 182.

In the physical embodiment of the rebalancing rheostat 136, as previously described with reference to FIGURES 2, 12 and 13, the variable tap 186 therein is driven to its variously selected positions on the main resistance element 184 by the operating shaft 172 of the said rheostat.

Direct current energization for the bridge circuit is brought in across the bridge diagonal T1–T3, the terminal T1 being shown in FIGURE 17 as positive and the terminal T3 as negative.

The bridge output signal in response to the unbalance created therein by a change in the temperature variable, or other variable, being monitored is generated across the diagonal T2–T4, the said second and fourth terminals comprising the output terminals of the bridge circuit.

First and second half-wave rectifier means D1 and D2, respectively, are connected at their respective anode terminals to the second and fourth bridge terminals T2 and T4.

The said rectifier means D1 and D2 are shunted, respectively, by the first and second limit switches 144 and 146 previously described with reference to FIGURES 12 and 13. As previously described, the said limit switches 144 and 146 are normally closed.

The energizing or stepping relay 134 includes first and second energizing windings L1 and L2, respectively, surrounding respective ends of a flexible multiple contact armature 188.

The armature 188 is fixed at its center in a permanent magnet 190, the latter including north and south pole pieces 192 and 194, respectively, which extend over the windings L1 and L2 and converge at opposite ends of the armature 188 forming first and second air gaps 196 and 198, respectively.

The magnetic flux in the first air gap 196, in response to energization of the coils L1 and L2, controls the position of a first pair of armature contacts 200 and 202 while that in the second air gap 198 controls the position of a second pair of armature contacts 204 and 206. The armature 188 is provided with first and second iron plate laminations 208 and 210, respectively, in the region of the said air gaps 196 and 198, whereby magnetic coupling is effected between the said armature and the field in the said air gaps.

In the first contact pair 200–202 the second armature contact 202 selectively makes with first and second winding terminals 212 and 214, respectively, which control the direction of current flow in the first relay winding L1. The first relay winding L1 is connected by means of a center tap 216 and a lead 218 to the cathode of the second rectifier means D2.

In the second contact pair 204–206, the fourth armature contact 206 selectively makes with second and third winding terminals 220 and 222, respectively, which control the direction of current flow in the second relay winding L2. The second relay winding L2 also has a center tap 224 which is also connected through lead 218 to the cathode of the second rectifier means D2.

All of the armature contacts 200, 202, 204 and 206 have a common electrical interconnection 226 which is connected via a lead 228 with the cathode of the first rectifier means D1.

The stepping motor section 10 of the control circuit of FIGURE 17, bears like numerals to FIGURE 6 as to the pole groups I, II, III and IV and the lead 42, common winding pole group connection 44, common connections 46 and 48 for pole groups I–III and II–IV, respectively, as well as the fixed selective contacts 50, 52, 54 and 56 on pole groups I, II, III and IV, respectively.

The first armature contact 200 selectively makes with the fixed selective contacts 50 and 54 of the pole groups I and III, respectively, while the third armature contact 204 selectively makes with the fixed selective contacts 52 and 56 of the pole groups II and IV, respectively.

The motor input lead 42 is connected to the positive side of a suitable D.C. source while the common connection 226 of the relay armature contacts is connected to the negative side of the said source B.

*Operation*

Referring to FIGURES 2 and 12 to 17, and assuming operation of the control system to be initially at mid-range of the proportional band thereof, the operation of the rotary motor 10 and integral control components and the control system will now be described.

At any mid-range condition of the system the limit switches 144 and 146 are closed, shunting out the respective first and second rectifier means D1 and D2.

The stepping motor 10 operates identically as previously described herein with reference to FIGURES 1 through 9.

Assume for example that a change in the monitored temperature variable results in an unbalance of the bridge circuit via the thermistor 176 such that the bridge output terminal T2 is of higher electrical potential than the other output terminal T4.

This results in a flow of current out of the terminal T2, through limit switch 144, lead 228, and common armature connection 226 to the relay coils L1 and L2 via the relay contacts 202 and 206, respectively.

The flow through the second relay coil L2 is from left to right through the terminal 222, center tap 224, lead 218 and limit switch 146, back to the output terminal T4.

Assume now that the stepping relay 134 is constructed such that current flow from left to right in the relay windings L2 will cause armature contacts 200 and 202 to make with contacts 50 and 212, respectively, and that flow from left to right in the relay coil L1 will cause armature contacts 204 and 206 to make with contacts 52 and 222, respectively.

Thus, if the control system circuit is initially in the condition shown in FIGURE 17, i.e., with motor pole groups II and III energized, the relative positive potential of the bridge output terminal T2 will cause group II to remain energized by holding armature contacts 204 and 206 in the make condition with respect to fixed contacts 52 and 222, respectively, and will energize pole group I by causing armature contacts 200 and 202 to make with contacts 50 and 212, respectively. This, as previously defined with respect to the chart in FIGURE 7, steps the motor 10 one counter-clockwise step by energizing the pole group pair I and II.

As soon as the armature contacts 20 and 202 have been shifted, the current in the first relay coil L1 is reversed, travelling now from left to right. This results in armature contacts 204 and 206 making with contacts 56 and 220, respectively, causing the energization of pole group IV, resulting in a reversal of current in the second relay coil L2 and a second counterclockwise step of the motor 10 via pole group pair I and IV.

The reversal of the current in the second coil L2 to a right-to-left path causes the armature contacts 200 and 202 to make with the contacts 54 and 214, respectively, causing the energization of pole group III, resulting in the reversal of current in the first relay coil L1 and a third counterclockwise step of the motor 10 via pole group pair III and IV.

As long as there is unbalance in the system, there will be a continuous flow of current out of the terminal T2.

A rebalance is effected by the step motor 10 driving the feedback shaft 128 to vary the resistance inserted in bridge leg T3–T4, by the rheostat 136, in discrete steps or increments until the bridge is balanced.

At balance, current ceases to flow and the permanent magnet 190 in the stepping relay latches the armature contacts in their last energized condition. Thus, the rotor 20 of the motor 10 is held in the position of balance until another change in the monitored variable results in the generation of an unbalance signal current from the bridge output terminals T2 and T4.

If the terminal control device (not shown) which is position modulated by the motor 10 via the output shaft 118 should reach one of its design limits of travel, the motor 10 will tend to oscillate on the last step taken because of slight dimensional discrepancies inherent in mechanical connections and power takeoffs.

This is taken care of by the free mounting of the control rheostat 136 on the feedback shaft 128 between the limit switches 144 and 146.

Rotary rheostats have internal stops or bosses engaging the variable tap at both the maximum and minimum resistance values therein. Since the rebalancing rheostat 136 is selected for the proportional band of the system, the internal stops (not shown) are adjusted such that they are engaged by the variable tap 186 within the design limits of the terminal control being used.

Thus, as the terminal control approaches a design limit of travel, the rotation of the feedback shaft 128 causes the variable tap 186 to abut one of said stops and rotate the entire rheostat housing and tab 138 with the feedback shaft 128. This results in one of the tab rises 140 or 142 engaging, respectively, either contact leaf 148 or 150 of the first and second limit switches 144 and 146, causing either the contact pair 156–160 or the contact pair 158–162 to break.

Depending on which one of the said limit switches 144 or 146 is caused to open, the respective associated one of the rectifier means D1 or D2 is brought into the circuit in the output current path of the bridge. This prevents the relay circuit from switching back to the previous sequence of pole group pairs and thus, no hunting or oscillation of the motor 10 can result about the last step or rotation.

The rectifier means energized is, therefore, the one which prevents further current flow in the direction analogous with the direction of unbalance in the monitored condition, cutting off the energizing circuit for the windings L1 and L2 of the stepping relay 134, the latter becoming latched into its last energized position to lock the rotor 20 of the motor 10 at its last stepped position.

A reverse direction of unbalance, however, will cause a current flow from the bridge terminals T2 and T4 in the forward direction of the energized one of the rectifier means D1 or D2 and will thus cause the motor 10 to step in reverse. The first reverse step drives the variable tap 186 of the rheostat 136 off the inner stop thereof, via the feedback shaft 127, permitting one of the coil springs 164 or 166 to close the previously open limit switch 144 or 146 and normal operation of the system is resumed.

The function of the return spring 122 of FIGURE 2 now becomes readily apparent. If there is a power failure in the circuit of the motor 10, the spring 122 drives the rotor 20, through the power takeoff 100, back to a predetermined zero position, thus providing a terminal control device driven by the output shaft 118 with a fail-safe actuation.

It is to be understood that the linear stepping motor 70 described herein with reference to FIGURES 9 and 10 is operated in identically the same manner as the rotary stepping motor 10 from the stepping relay 134 and the bridge circuit of the condition control system.

Suitable linear-to-rotary drive means are employed between the armature 80 and the rebalancing potentiometer 136 such as is readily achievable by those skilled in the art after presentation thereto of the teachings of this invention as hereinbefore set forth.

As can be seen from the foregoing specification and drawings, this invention satisfies a long felt need in both the motor and the control arts by providing simple, reasonably priced, foolproof and precision stepping motors for effecting both linear and rotary quantized displacements, with particular adaptivity in the precise actuation of terminal controls in automatic condition modulating control systems.

It is to be understood that the several embodiments of the invention shown and described herein are for the purpose of example only and are not intended to limit the scope of the appended claims.

What is claimed is:

1. A control system for modulating a process variable in response to a variation of a controlled variable from a preselected value thereof comprising, an impedance bridge including sensor means unbalancing said bridge as a function of said controlled variable, feedback means rebalancing said bridge as a function of said process variable, and output terminals producing an unbalance signal as a function of the direction of unbalance of said controlled variable from said preselected value thereof; a stepping motor modulating said process variable and said feedback means in discrete quantized increments of modulation; and relay means interconnected with said output terminals and said stepping motor directionally energizing said motor as a function of said unbalance signal.

2. A condition control system providing quantized modulation of a selected condition comprising impedance bridge means, condition responsive variable impedance means in said bridge means in response to variations in the value of said selected condition from a preselected value thereof, said bridge means having output terminals and producing an output signal across said terminals having a polarity representative of the direction of the variation of the value of said condition from said preselected value; a stepping motor having a stator and armature means, said armature means being adapted to be variably displaced in a series of quantized steps proportional in number to the magnitude of the variation in the value of said condition, a plurality of pole pieces in said stator, a plurality of groups of energizing windings on said pole pieces, each of said groups when energized imparting a predetermined combination of magnetic polarities to said pole pieces; a power source; relay means connected across said output terminals of said bridge means and energized by said output signal progressively interconnecting said groups of windings with said power source in preselected permutations of said groups of windings, said permutations being preselected as a function of the polarity of said output signal; variable impedance rebalancing means in said bridge means; terminal condition control means driven by said armature means; and feedback means interconnecting said armature means and said rebalancing means; said armature means thereby effecting rebalancing of said bridge means and simultaneous modulation of said condition in discrete quantized steps.

3. The invention defined in claim 2, wherein said system further includes armature displacement limit control means in circuit between said relay means and said output terminals including switch means interconnected with said armature means and unidirectional impedance means selectively controlled by said switch means effecting de-energization of said relay means in response to predetermined displacements of said armature means.

4. The invention defined in claim 2, wherein said system further includes means providing an operating range for said armature means between first and second limits of displacement thereof comprising, first and second limit switches engaged by said armature means at the said first and second limits, respectively, said switch means being connected in series between respective ones of said output terminals of said bridge means and said relay means, and first and second unidirectional impedance means connected in shunt with said first and second switch means, respectively, and selectively controlled by said switch means effecting a de-energization of said relay means when said armature has been displaced to said first and second limits of displacement.

5. In a condition control system including a stepping motor having a step actuated armature and an output coupling on said armature, control means defining first and second limits of displacement for said armature and providing a change of electrical impedance as a function of displacement of said armature comprising a power takeoff driven by said armature, mounting means, position variable impedance means on said mounting means, a displaceable actuator for said variable impedance means interconnected with said mounting means and having a fixed range of displacement, resilient means holding said mounting means in a fixed position throughout said fixed range of displacement of said displaceable actuator, said resilient means comprising first and second resiliently biased limit switch means engaging said mounting means in mutual opposition to displacement thereof throughout said fixed range of displacement, relay means selectively energizing said motor means to actuate said armature selectively controlled by said limit switch means and feedback means interconnecting said power takeoff and said displaceable actuator driving said mounting means against a selected one of said limit switch means when said displaceable actuator tends to exceed said fixed range of displacement thereof, whereby said relay means is selectively de-energized to prevent further actuation of said armature.

References Cited

UNITED STATES PATENTS

| | | | |
|---|---|---|---|
| 2,105,513 | 1/1938 | Welch | 310—162 X |
| 2,503,513 | 4/1950 | Schellman | 318—29 |
| 2,627,040 | 1/1953 | Hansen | 310—49 |
| 2,890,392 | 6/1959 | Bruck et al. | 317—149 |
| 2,914,717 | 11/1959 | Redding | 318—29 |
| 3,005,941 | 10/1961 | Heggen | 318—443 |
| 3,164,759 | 1/1965 | Connors et al. | 318—28 |
| 3,165,681 | 1/1965 | Pinckaers | 318—28 |

WARREN E. RAY, Primary Examiner.

U.S. Cl. X.R.

310—14, 49; 318—28, 138